US00RE34941E

United States Patent [19]

Gray et al.

[11] E Patent Number: Re. 34,941

[45] Reissued Date of Patent: May 16, 1995

[54] SEAT BELT RETRACTOR

[75] Inventors: Mark F. Gray; Ken M. Forget, both of Ontario, Canada

[73] Assignee: TRW Vehicle Safety Systems Ltd., Toronto, Canada

[21] Appl. No.: 216,822

[22] Filed: Mar. 23, 1994

Related U.S. Patent Documents

Reissue of:

[64] Patent No.: 5,080,299
Issued: Jan. 14, 1992
Appl. No.: 611,928
Filed: Nov. 9, 1990

[51] Int. Cl.[6] ..... B60R 22/40

[52] U.S. Cl. ..... 242/382.2

[58] Field of Search ..... 242/382.2, 382.4; 280/806, 807; 297/478, 480

[56] References Cited

U.S. PATENT DOCUMENTS

| | | | |
|---|---|---|---|
| 4,427,164 | 1/1984 | Rumpf | 242/378.4 |
| 4,518,132 | 5/1985 | Schmidt | 242/382.2 |
| 4,573,646 | 3/1986 | Willey | 242/382.2 |
| 4,583,701 | 4/1986 | Matsui et al. | 242/382.2 |
| 4,597,546 | 4/1986 | Yamamoto et al. | 242/382.2 |
| 4,726,539 | 2/1988 | Schmidt et al. | 242/382.2 |
| 4,729,524 | 3/1988 | Befort et al. | 242/382.2 X |
| 4,749,143 | 6/1988 | Tsukamoto et al. | 242/382.2 |
| 4,765,558 | 8/1988 | Higbee | 242/382.2 X |
| 4,768,733 | 9/1988 | Willey | 242/383 |
| 4,809,926 | 3/1989 | Koike | 242/382.2 |
| 4,811,912 | 3/1989 | Takada | 242/382.2 |
| 5,037,038 | 8/1991 | Zygutis et al. | 242/382.2 |

*Primary Examiner*—John M. Jillions
*Attorney, Agent, or Firm*—Tarolli, Sundheim & Covell

[57] ABSTRACT

A seat belt retractor includes a rotatable spool around which a seat belt is wound for storage and from which the seat belt is unwound for use. A ratchet wheel is fixed to the spool. A locking pawl is movable between a disengaged position spaced from the ratchet wheel to an engaged position engaging the ratchet wheel to prevent rotation of the spool in a belt unwinding direction. A cinch mechanism includes an actuator member which is movable from a retracted position to an extended position to move the locking pawl from the disengaged position to the engaged position. A web follower or sensor member is engageable with the seat belt and is movable in response to winding and unwinding of the seat belt. As the seat belt is unwound, the web follower pivots from a first position to a second position. As this occurs, an overcenter spring pivots the actuator member from the retracted position to the extended position, with a snap action, to move the locking pawl into engagement with the ratchet wheel.

15 Claims, 6 Drawing Sheets

SEAT BELT RETRACTOR

Matter enclosed in heavy brackets [ ] appears in the original patent but forms no part of this reissue specification; matter printed in italics indicates the additions made by reissue.

BACKGROUND OF THE INVENTION

1. Technical Field

The present invention relates to a seat belt retractor for a vehicle. More particularly the present invention relates to a seat belt retractor having a cinch mechanism for blocking seat belt withdrawal from the retractor.

2. Description of the Prior Art

U.S. Pat. No. 4,597,546 discloses a seat belt retractor having a cinch mechanism for blocking seat belt withdrawal from the retractor. The cinch mechanism includes a lever which engages a portion of the seat belt wound on a spool of the retractor. As the seat belt is unwound from the spool, the lever moves. When the lever reaches a predetermined position, a locking pawl is moved into engagement with a ratchet wheel fixed to the spool to prevent further withdrawal of the seat belt. An overcenter spring acts between the frame of the retractor and the locking pawl The overcenter spring moves the locking pawl into engagement with the ratchet wheel and holds the locking pawl in engagement with the ratchet wheel. Other known seat belt retractors having cinch mechanisms with overcenter springs are disclosed in U.S. Pat. Nos. 4,427,164; 4,729,524; and 4,765,558.

SUMMARY OF THE INVENTION

The seat belt retractor of the present invention includes a cinch mechanism which is operable from a disengaged condition to an engaged condition to block withdrawal of a seat belt from a spool of the retractor on which the seat belt is wound. The cinch mechanism is actuated from the disengaged condition to the engaged condition in response to unwinding of the seat belt from the retractor spool.

The cinch mechanism includes a web follower or sensor member which is pivoted between first and second positions in response to winding and unwinding of the seat belt. The web follower is in its first position when a predetermined portion of the seat belt is wound on the spool. The web follower is in its second position when less than the predetermined portion of the seat belt is wound on the spool.

When the web follower pivots from the first position to the second position in response to unwinding of the seat belt from the spool, an overcenter spring pivots an actuator member from a retracted position to an extended position with a snap action. Movement of the actuator member to the extended position moves a locking pawl into engagement with a ratchet wheel connected to the spool. When the locking pawl engages the ratchet wheel, the locking pawl blocks rotation of the spool in the seat belt withdrawal direction. However, the spool can rotate in the seat belt retraction direction.

BRIEF DESCRIPTION OF THE DRAWINGS

The foregoing and other features of the present invention will become more apparent to one skilled in the art upon consideration of the following description taken in connection with the accompanying drawings, wherein.

DESCRIPTION OF PREFERRED EMBODIMENT

Figure 1:
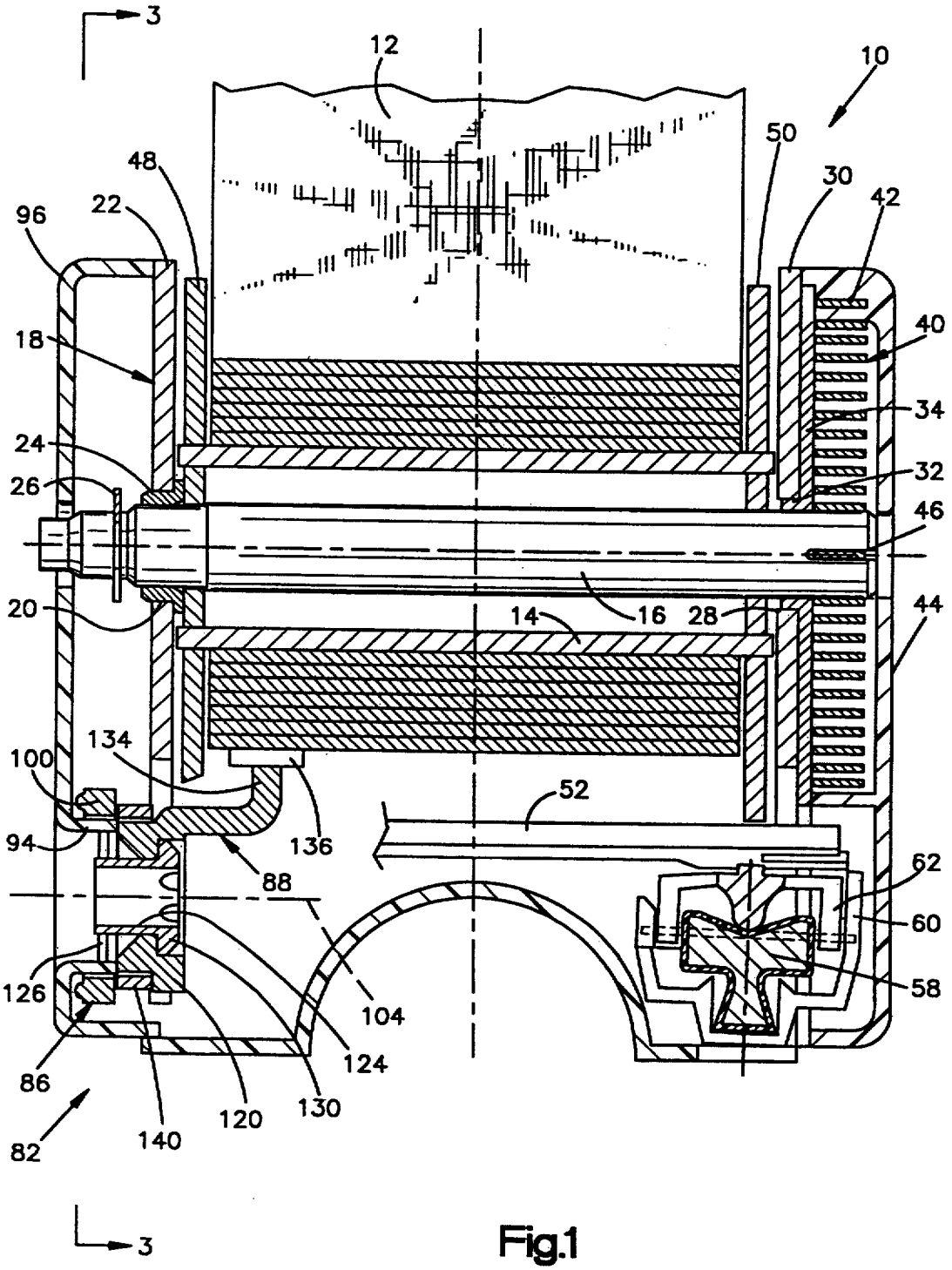
FIG. 1 is a sectional view of a seat belt retractor having a cinch mechanism constructed in accordance with the present invention.

A seat belt retractor 10 (FIGS. 1 and 2) has a length of seat belt webbing 12 (FIG. 1) which is wound around a spool 14. The spool 14 is fixed to and is coaxial with a shaft 16. The spool 14 is rotatable with the shaft 16 in a generally U-shaped retractor frame 18 (FIG. 2) which is to be secured to a vehicle.

One end of the cylindrical shaft 16 extends through an opening 20 (FIG. 1) in one frame side 22 of the retractor frame 18. The shaft is supported in the circular opening 20 by a bearing 24. A retainer 26 limits axial movement of the shaft 16. The opposite end of the shaft 16 extends through a circular opening 28 in the other frame side 30, and is supported on a bearing portion 32 (FIG. 1) of a support plate 34 fixed to the frame side 30.

Figure 2:
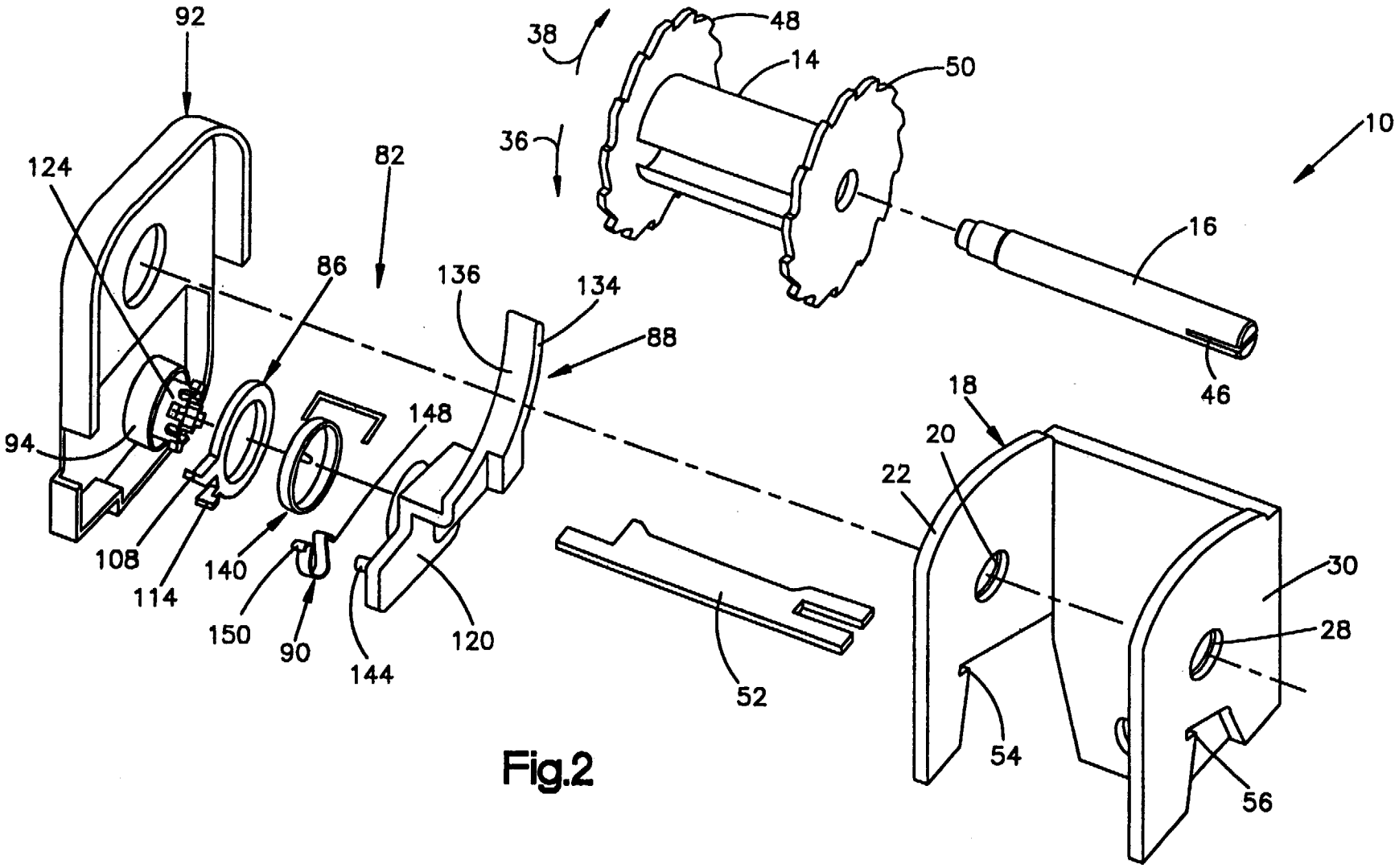
FIG. 2 is a simplified exploded illustration of some of the components of the seat belt retractor of FIG. 1.

The spool 14 is rotatable in a belt retraction direction 36 (FIG. 2) and a belt withdrawal direction 38 (FIG. 2). A coil spring 40 (FIG. 1) biases the spool 14 to rotate in the belt retraction direction 36. An outer end 42 of the spring 40 is received in a slot in a cover 44 fixed to the frame 18. An inner end of the spring 40 is received in a slot 46 in one end of the shaft 16. The spring 40 acts through the shaft 16 to bias the spool 14 in the belt retraction direction 36.

A pair of spool locking, toothed metal ratchet wheels 48 and 50 are fixed to the spool 14 and rotate with the spool. A metal locking pawl 52 is supported for pivotal movement in openings 54 and 56 (FIG. 2) in the retractor frame 18. The locking pawl 52 is pivotable into engagement with the teeth of the circular metal ratchet wheels 48 and 50 to block rotation of the spool 14 in the belt withdrawal direction 38.

An inertia mass 58 (FIG. 1) is supported in a housing 60 fixed to the frame 18. An inertia lever 62 is pivotally mounted to the housing 60 and is engaged by the inertia mass 58. Upon vehicle deceleration at a rate above a predetermined rate, the inertia mass 58 moves relative to the retractor frame 18, pivoting the inertia lever 62 to move the locking pawl 52. The locking pawl 52 moves into engagement with the spool locking ratchet wheels 48 and 50, blocking withdrawal of the seat belt webbing 12. When the vehicle deceleration at a rate above the predetermined rate ends, the locking pawl 52 drops by gravity away from the ratchet wheels 48 and 50. Alternatively, movement of the inertia mass 58 could actuate the locking pawl 52 in the manner disclosed in U.S. Pat. No. 4,632,331.

Figure 3:
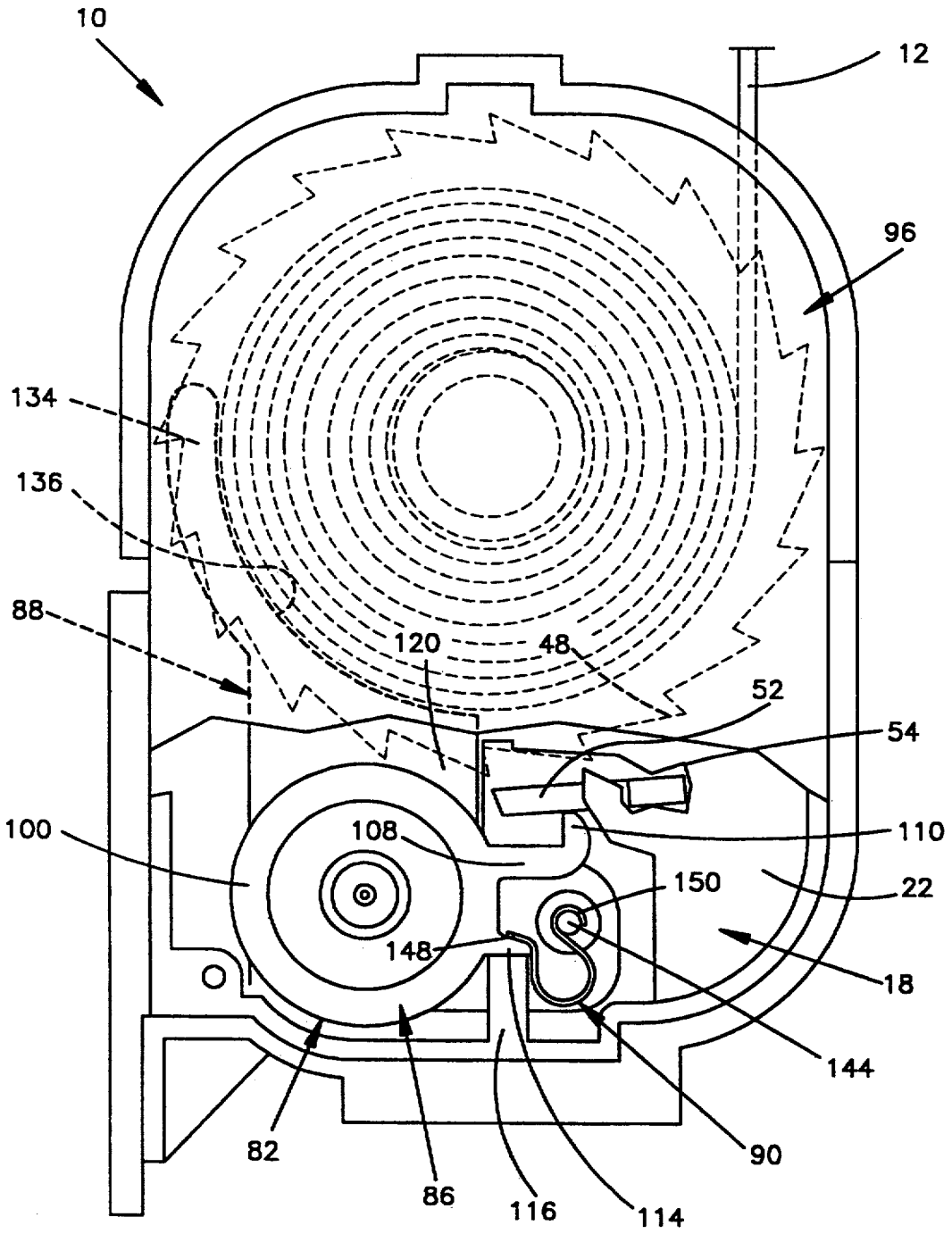
FIG. 3 is a partially broken away side elevational view, taken generally along the line 3—3 of FIG. 1, illustrating the cinch mechanism in a disengaged condition prior to unwinding of the seat belt.
Figures 4, 5, 6:
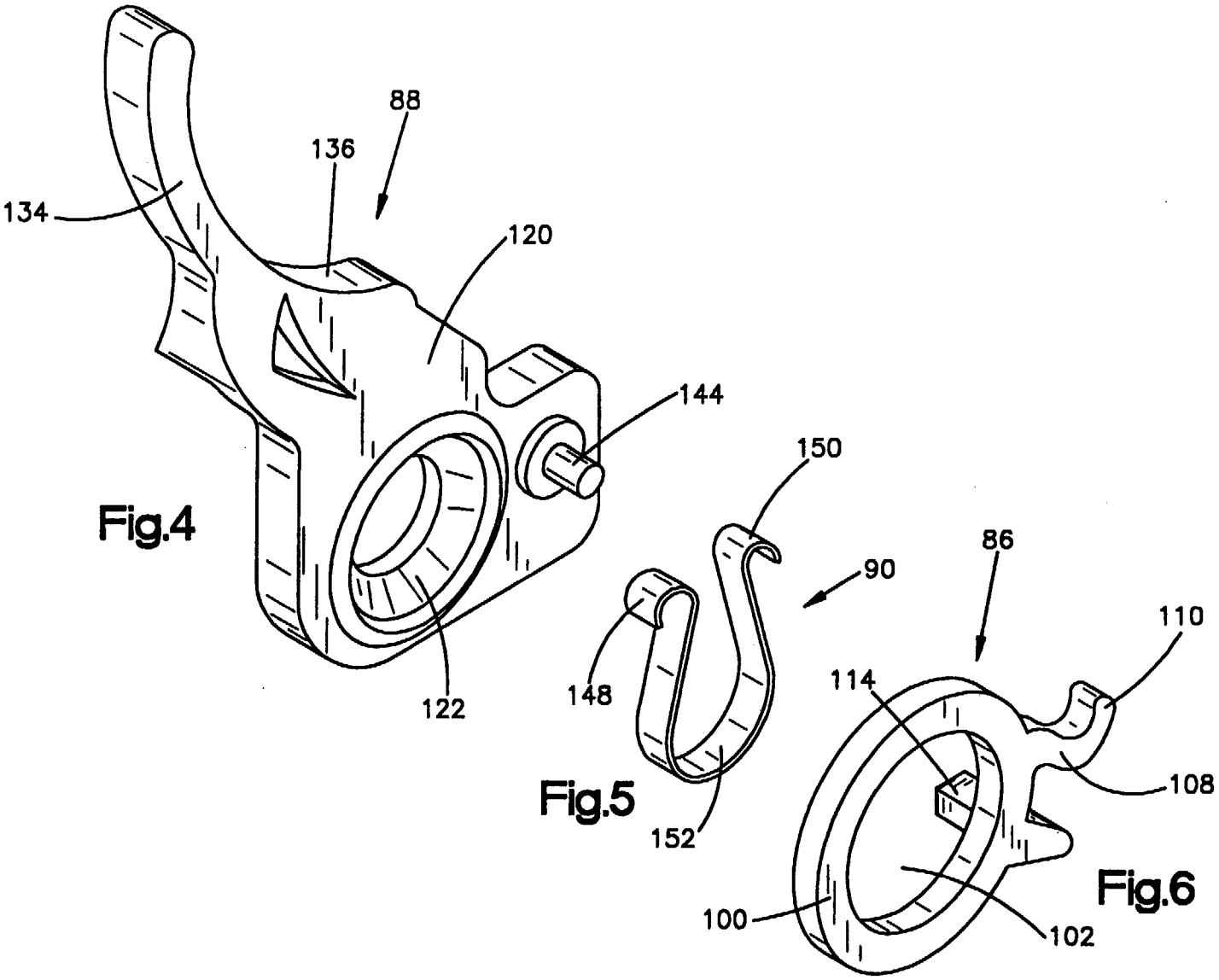
FIG. 4 is a pictorial illustration of a web follower or sensor member which is a part of the cinch mechanism and is moved in response to winding and unwinding of the seat belt from the spool.
FIG. 5 is an illustration of an overcenter spring which is another part of the cinch mechanism.
FIG. 6 is a pictorial illustration of an actuator member which is still another part of the cinch mechanism.

In accordance with a feature of the present invention. the retractor 10 includes cinch mechanism 82. The cinch mechanism 82 includes an actuator member 86 (FIGS. 1–3 and 6), a web follower or sensor member 88 (FIGS. 1–4), and an overcenter spring 90 which acts between the web follower 88 and actuator member 86 (FIG. 3).

The actuator member 86 is a one piece, molded plastic member and has an annular body portion 100 (FIGS. 1 and 6) with a circular central opening 102. The radially inner circumference of the body portion 100 engages an axially extending cylindrical outer side surface of a boss 94 (FIG. 1) formed on a side cover 96 of [the retractor assembly 10] *a cover assembly 92*. The actuator member 86 is thus pivotable about a central axis 104 of the boss 94. The actuator member 86 has an arm 108 (FIG. 6) which extends radially outwardly from the annular body portion 100 of the actuator member. The actuator arm 108 has a nose or end portion 110. A spring mounting arm 114 (FIG. 6) extends axially from the periphery of the annular body portion 100 of the actuator member 86.

One end portion of the overcenter spring 90 (FIG. 3) engages the mounting arm 114. The spring mounting arm 114 engages a stop section 116 which is formed as part of the retractor side cover 96. The overcenter spring 90 acts to press the spring mounting arm 114 against the stop section 116.

The web follower or sensor member 88 is a one piece. molded plastic member (FIG. 4) and includes a mounting section 120. The mounting section 120 has a circular opening 122 which receives a generally cylindrical stub shaft or projection 124 (FIG. 1) which is molded as one piece with the side cover 96. The stub shaft 124 is supported by a plurality of web sections 126 which extend radially between the stub shaft 124 and the boss 94. The stub shaft 124 has a segmented head end portion 130 which engages the mounting section 120 of the web follower 88 to hold the web follower on the stub shaft.

The stub shaft 124 supports the web follower 88 for pivotal movement about the central axis 104 of the boss 94. A follower arm 134 extends upwardly and sidewardly from the mounting section 120. The follower arm 134 has a curved inner side surface 136 (FIGS. 2, 3 and 4) which engages the portion of the seat belt 12 rolled on the spool 14.

A torsion spring 140 (FIGS. 1 and 2) is disposed between the web follower 88 and the actuator member 86. One end of the torsion spring 140 is connected with the web follower 88. The opposite end of the torsion spring 140 is connected with the side cover 96. The torsion spring 140 presses the arcuate inner side surface 136 of the follower arm 134 (FIG. 3) against the rolled up portion of the seat belt 12 on the spool 14.

A spring mounting pin 144 (FIG. 4) extends from the mounting section 120 of the web follower 88. The spring mounting pin 144 is engaged by an end portion of the overcenter spring 90 (FIG. 3). Thus, one end 148 of the overcenter spring 90 engages the spring mounting arm 114 on the actuator member 86. The opposite end 150 of the overcenter spring 90 engages the mounting pin 144 on the web follower 88.

The overcenter spring 90 (FIG. 5) has a generally U-shaped configuration. An arcuately curved main or body section 152 (FIG. 5) of the overcenter spring 90 extends between the ends 148 and 150 of the overcenter spring 90. The overcenter spring 90 is formed as a single piece of resiliently deflectable spring steel.

Figure 7:
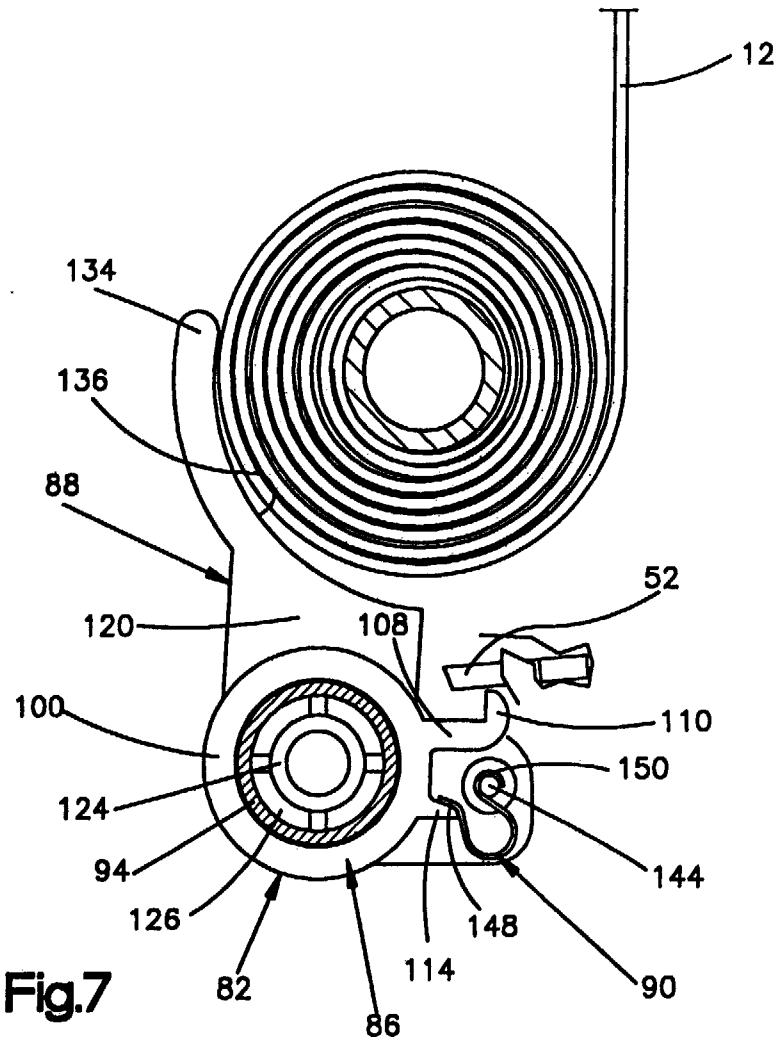
FIG. 7 is a simplified schematic illustration depicting the relationship between the web follower and actuator member of FIGS. 4 and 6, respectively, when the seat belt is wound on the spool.

When the seat belt 12 is wound on the spool 14, the cinch mechanism 82 is in a disengaged condition illustrated schematically in FIG. 7. At this time, the torsion spring 140 (FIG. 1) presses the arcuate inner side surface 136 on the web follower or sensor member 88 against the rolled-up seat belt 12 (FIG. 7). The overcenter spring 90 presses the spring mounting arm 114 on the actuator member 86 against the stop section 116 (FIG. 3) formed on the retractor side cover 96. The locking pawl 52 is in the disengaged condition spaced from the ratchet wheels 48 and 50. Therefore, the spool 14 can be freely rotated to extend and retract the seat belt 12.

When the seat belt 12 has been partially unwound from the spool 14 (FIG. 8), the cinch mechanism 82 remains in the disengaged condition. The web follower member 88 will have pivoted about the stub shaft 124 from the position shown in FIG. 7 to the position shown in FIG. 8. Nonetheless, the spring mounting pin 144 on the web follower 88 will not have moved below the spring mounting arm 114 on the actuator member 86. Therefore, the overcenter spring 90 is still effective to press the spring mounting arm 114 against the stop section 116 of the retractor side cover 96, as shown in FIG. 3.

As the web follower 88 is pivoted from the position shown in FIG. 8 to the position shown in FIG. 9, in response to withdrawal of the seat belt 12 from the spool 14, the center of the spring mounting pin 144 on the web follower moves slightly below the central axis of the spring mounting arm 114 on the actuator member 86. When this occurs, the overcenter spring 90 snaps upwardly (as viewed in FIG. 9) and pivots the actuator member 86 in a counterclockwise direction. This moves the outer end portion 110 of the actuator arm 108 upwardly to press the locking pawl 52 upwardly into engagement with the teeth of the ratchet wheels 48 and 50.

Figure 8:
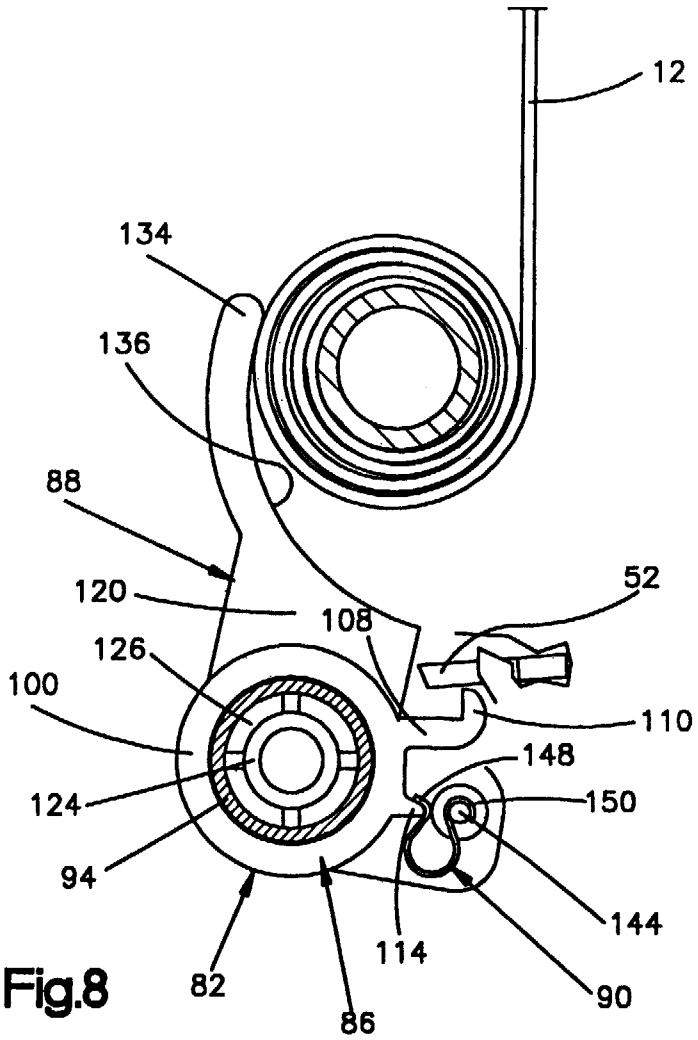
FIG. 8 is a simplified schematic illustration, generally similar to FIG. 7, illustrating the relationship between the web follower and actuator member after a portion of the seat belt has been unwound from the spool.
Figure 9:
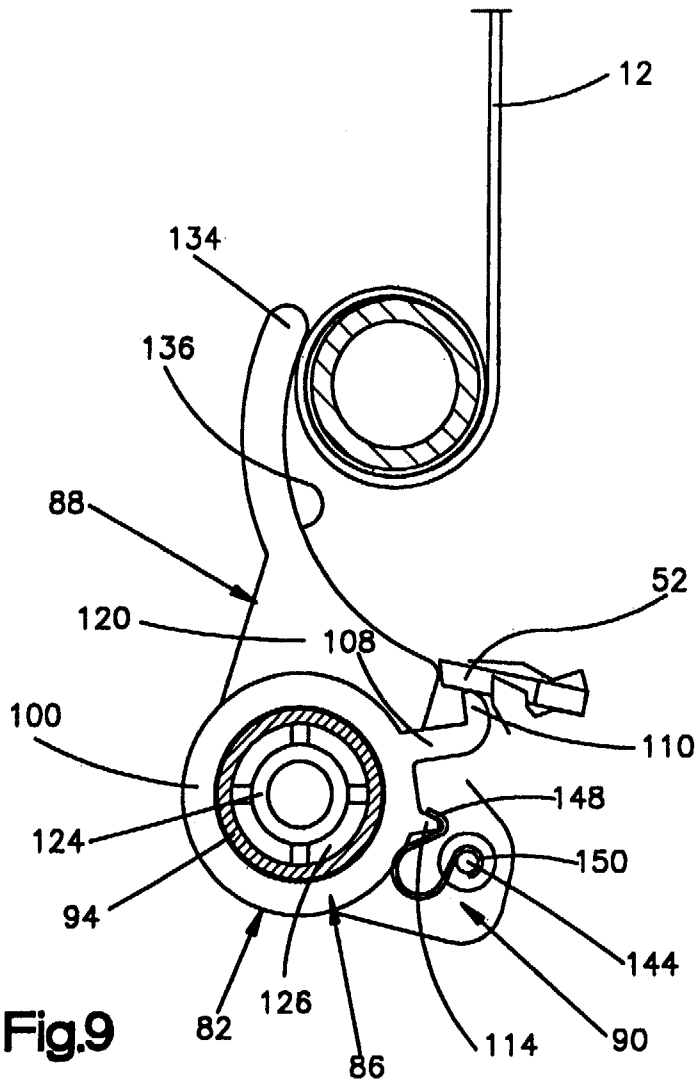
FIG. 9 is a simplified schematic illustration, generally similar to FIGS. 7 and 8, illustrating the relationship between the web follower and actuator member upon operation of the cinch mechanism to an engaged condition.

When most of the seat belt 12 has been withdrawn from the spool 14, and only a predetermined portion of the belt remains wound on the spool, the cinch mechanism 82 is operated from the disengaged condition of FIG. 8 to the engaged condition of FIG. 9. In one specific embodiment of the invention, the seat belt extends only three-quarters of the way around the spool 14 when the cinch mechanism is operated to the engaged condition of FIG. 9.

Once the locking pawl 82 has engaged the ratchet wheels 48 and 50, the locking pawl cooperates with the ratchet wheels to block rotation of the spool 14 in a seat belt withdrawal direction. The cooperation between the locking pawl 52 and the ratchet wheels 48 and 80 still enables the seat belt to be wound onto the spool 14 under the influence of the biasing spring 40 (FIG. 1). Therefore, the seat belt 12 can be retracted from its extended condition after the cinch mechanism 82 has been operated to the engaged condition of FIG. 9.

To actuate the cinch mechanism 82 from the engaged condition of FIG. 9 back to the disengaged condition of FIG. 7, the seat belt 12 is wound back onto the spool 14. As the seat belt 12 is wound onto the spool 14, the increasing diameter of the rolled up portion of the seat belt pivots the web follower 88 in a clockwise direction from the position shown in FIG. 9 toward the position shown in FIG. 7. As this occurs, the spring mounting pin 144 on the web follower 88 moves upwardly relative to the spring mounting arm 114 on the actuator member 86.

When the predetermined portion of the seat belt is again wound on the spool, the center of the spring mounting pin 144 on the web follower 88 moves above the central axis of the spring mounting arm 114 on the actuator member 86. The overcenter spring 90 then acts between the actuator member 86 and web follower to urge the actuator member 86 to rotate in a counterclockwise direction from the position shown in FIG. 9 to the position shown in FIG. 7 with a snap action. As this occurs, the actuator arm 114 moves downwardly into engagement with the stop section 116 on the retractor side cover 96. In addition, the locking pawl 52 is released for pivotal movement away from the engaged position shown in FIG. 9 to the disengaged position shown in FIG. 7. Once the locking pawl 82 has swung downwardly to the disengaged position shown in FIG. 7, the spool 14 is free to rotate in either a web retracting or a web withdrawal direction.

From the above description of the invention, those skilled in the art will perceive improvements, changes and modifications in the invention. Such improvements, changes and modifications are intended to be covered by the appended claims.

Having described the invention, the following is claimed:

1. A vehicle seat belt retractor comprising:

a rotatable spool around which a seat belt is wound for storage and from which the seat belt is unwound for use;

a ratchet wheel fixed to said spool for rotation therewith;

a locking pawl movable between a disengaged position spaced from said ratchet wheel and an engaged position in which said locking pawl engages said ratchet wheel to prevent rotation of said spool in a belt unwinding direction;

an actuator member movable from a retracted position to an extended position to move said locking pawl from the disengaged position to the engaged position;

a sensor member engageable with the seat belt and movable in response to winding and unwinding of the seat belt, said sensor member assuming a first position when at least a predetermined portion of said seat belt is wound on said spool and assuming a second position when less than said predetermined portion of the seat belt is wound on said spool, said sensor member being movable between said first and second positions; and spring means connected between said sensor member and said actuator member for urging said actuator member to the retracted position when said sensor member is in the first position and for urging said actuator member to the extended position when said sensor member moves to the second position thereby to move said locking pawl to the engaged position in response to unwinding of the seat belt from said spool.

2. A vehicle seat belt retractor as set forth in claim 1 wherein said spring means comprises an overcenter spring which acts between said actuator member and said sensor member.

3. A vehicle seat belt retractor as set forth in claim 1 further including biasing spring means for maintaining said sensor member in engagement with the seat belt during winding of the seat belt on the spool and unwinding of the seat belt from the spool.

4. A seat belt retractor as set forth in claim 1 wherein said spring means has a first end portion disposed in engagement with said sensor member for movement therewith during unwinding of the seat belt and movement of said sensor member from the first position to the second position, said spring means having a second end portion disposed in engagement with said actuator member for movement therewith during movement of said actuator member from the retracted position to the extended position.

5. A seat belt retractor as set forth in claim 1 wherein said sensor member is movable through a range of movement from the first position to the second position as the seat belt is unwound from said spool, said spring means being effective to urge said actuator member to the retracted position during movement of said sensor member from the first position through at least a major portion of the range of movement of said sensor member, said spring means being operable to move said actuator member from its retracted position to its extended position with a snap action during movement of said sensor member to its second position.

6. A vehicle seat belt retractor as set forth in claim 5 wherein said spring means is resiliently deflected by said sensor member as said sensor member moves from the first position through the major portion of the range of movement of said sensor member.

7. A vehicle seat belt retractor as defined in claim 6 further including means for mounting said sensor member and said actuator member for pivotal movement about a common axis.

8. A vehicle seat belt retractor comprising:

a rotatable spool around which a seat belt is wound for storage and from which the seat belt is unwound for use;

a ratchet wheel fixed to said spool for rotation therewith;

a locking pawl movable between a disengaged position spaced from said ratchet wheel and an engaged position in which said locking pawl engages said ratchet wheel to prevent rotation of said spool in a belt unwinding direction;

an actuator member pivotable from a retracted position to an extended position to move said locking pawl from the disengaged position to the engaged position;

a sensor member engageable with the seat belt wound on the spool and pivotable relative to said actuator member in response to winding and unwinding of the seat belt, said sensor member assuming a first position when at least a predetermined portion of said seat belt is wound on the spool and assuming a second position when less than said predetermined portion of the seat belt is wound on the spool, said sensor member being movable between said first and second positions;

means for mounting said sensor member and said actuator member for pivotal movement about a common axis; and spring means acting between said sensor member and said actuator member for locating said actuator member in the retracted position when said sensor member is in the first position and for pivoting said actuator member to the extended position in response to pivoting of said sensor member relative to said actuator member to said second position thereby to move said locking pawl to the engaged position in response to unwinding of the seat belt from said spool.

9. A vehicle seat belt retractor as defined in claim 8 wherein said spring means comprises a spring urging said actuator member to the retracted position when the sensor member is in the first position and for urging said actuator member to the extended position as said sensor member moves toward the second position.

10. A vehicle seat belt retractor as defined in claim 9 further including a stop against which said actuator member rests when in the retracted position.

11. A vehicle seat belt retractor as defined in claim 10 wherein said actuator member has a portion which engages said locking pawl to move said locking pawl from the disengaged position to the engaged position.

12. A vehicle seat belt retractor as defined in claim 10 further including a U-shaped frame with two legs, said rotatable spool being supported for rotation by the legs of said U-shaped frame, and wherein said means for mounting said sensor member and said actuator member for pivotal movement comprises a cover connected to said U-shaped frame.

13. A vehicle seat belt retractor as defined in claim 12 wherein said cover has a circular boss on which said actuator is pivotally mounted.

14. A vehicle seat belt retractor as defined in claim 13 wherein said cover has a projection coaxial with said circular boss and on which said sensor member is pivotally mounted.

15. A vehicle seat belt retractor as defined in claim 14 wherein said sensor member has a curved portion which engages the seat belt wound on the spool.

* * * * *